Aug. 31, 1943.   O. A. PEARSON   2,328,228
CORE ASSEMBLY
Filed June 10, 1941
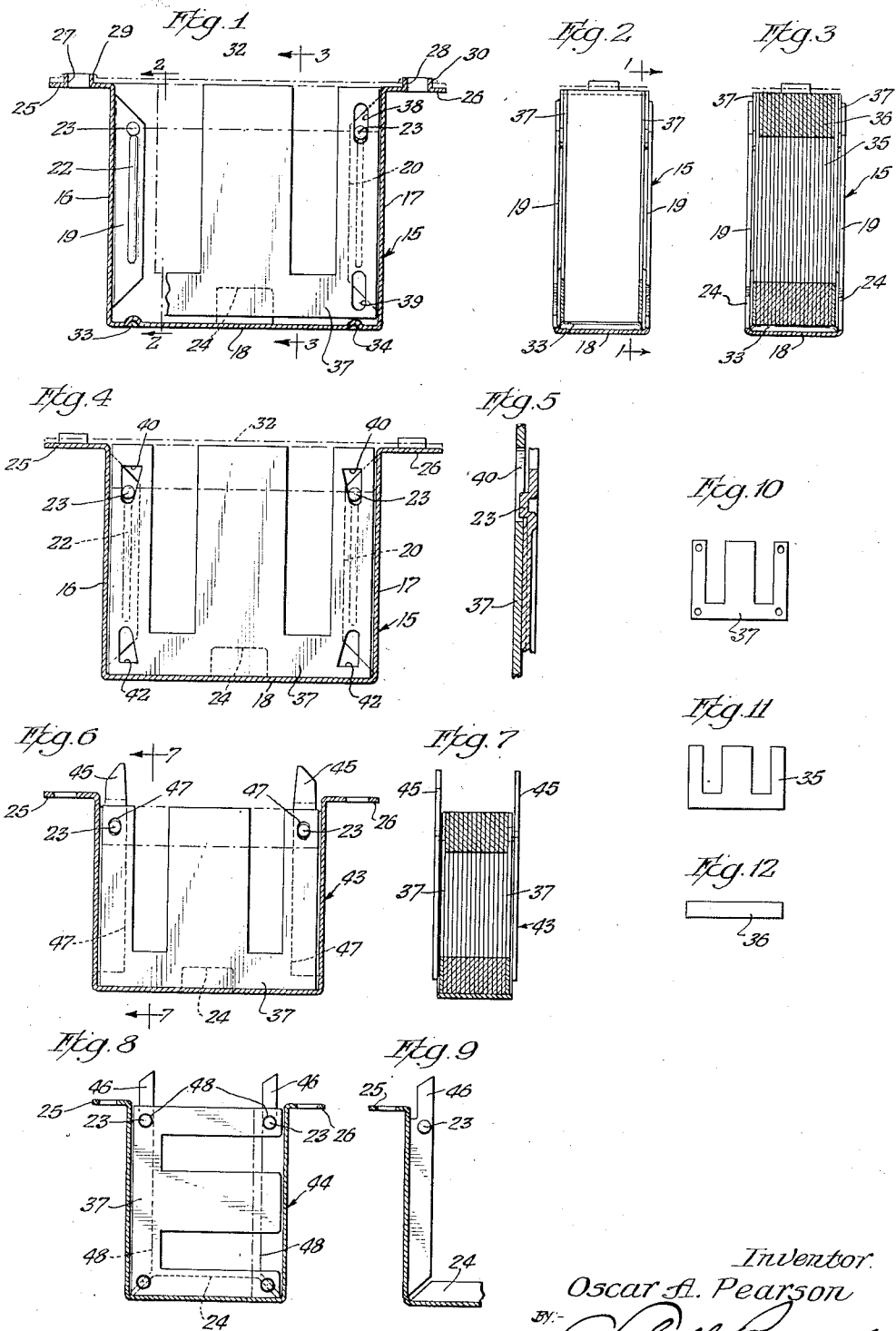
Inventor
Oscar A. Pearson Patented Aug. 31, 1943

2,328,228

UNITED STATES PATENT OFFICE 2,328,228

CORE ASSEMBLY

Oscar A. Pearson, Oak Park, Ill., assignor to Jefferson Electric Company, Bellwood, Ill., a corporation of Illinois Application June 10, 1941, Serial No. 397,491

4 Claims. (Cl. 175—356)

This invention relates to a core assembly, and more particularly to a magnetic core assembly for electrical apparatus which includes means for holding the parts of the assembly together in their proper assembled relation.

An object of this invention is to provide an efficient core assembly for electrical apparatus which is easily assembled and inexpensive to manufacture.

Another object of this invention is to provide a core assembly for electrical apparatus which includes means for holding the parts of the core together in their assembled relation.

Further objects and advantages of the present invention will be apparent from the following description, reference being had to the accompanying drawing wherein a preferred embodiment of the present invention is clearly shown.

In the drawing:

Figure 1 is a sectional plan view of a device embodying a preferred form of the present invention with portions of some parts cut away to illustrate particular details of the invention and with the section taken substantially on a line 1—1 of Figure 2 when viewed in the direction indicated by the arrows;

Figures 2 and 3 are side sectional views of a complete device such as that illustrated in Figure 1 with the sections taken substantially on the lines 2—2 and 3—3 respectively of Figure 1;

Figures 4, 6 and 8 are sectional plan views of modified forms of the present invention;

Figure 5 is a fragmentary sectional view of a detail of the structure shown in Figure 4;

Figure 7 is a side sectional view of the structure shown in Figure 6, with the section taken substantially on a line 7—7 of Figure 6 and viewed in the direction indicated by the arrows;

Figure 9 is a fragmentary sectional view of a portion of the structure illustrated in Figure 8; and Figures 10, 11 and 12 are plan views of parts similar to those utilized in the illustrated assemblies.

Having particular reference to Figures 1, 2 and 3, a bracket or frame 15 is preferably substantially U-shaped having sides 16 and 17 and an end 18 which is preferably integral with and connects the sides. Side flanges or wings 19 and 20 are provided on, and are preferably integral with opposite sides of the sides 16 and 17. The side flanges or wings 19 and 20 are substantially at right angles to their respective sides 16 and 17 to form channels. The side flanges or wings 19 and 20 are preferably fluted as at 22 to make them more rigid, and have integrally formed detents such as 23 near the extending ends of the sides. The end 18 preferably has oppositely disposed angularly projecting tabs such as 24 integral therewith which provide a channel section at the mid-portion of the end. Mounting feet 25 and 26 are provided on the ends of the side 16 and 17 and have openings 27 and 28 therein for the accommodation of mounting screws. In this form, the mounting openings 27 and 28 are extruded to provide flanges 29 and 30 which are riveted over to secure in place an insulating retaining strip which is indicated by dot and dash lines at 32. Transverse spacing ribs 33 and 34 are preferably formed in the end 18.

A core comprising cooperating stacks of substantially E-shaped laminations 35 of magnetic material and substantially I-shaped laminations 36 of magnetic material fits into the channels provided by the frame or bracket 15 and rests against the transverse ribs 33 and 34. The I-shaped laminations extend across the ends of the legs of the E-shaped laminations and are butted against the ends to provide a closed magnetic core circuit. Outer laminations 37 on each side of the core comprising the laminations 35 and 36 are E-shaped and conform to the E-shaped laminations 35, except that the legs extend across both the E-shaped and I-shaped laminations of the core. These outer or retaining laminations 37 are preferably made of magnetic material similar to the core, but may be made of other metal or material. Openings 38 which are preferably elongated are provided in the outer or retaining laminations 37 near the ends of the outer legs thereof. The detents 23 fit into the openings 38 to aid in holding the core in place with respect to the frame or bracket and to prevent the open ends of the sides 16 and 17 from spreading apart. Additional openings such as 39 are provided in the outer or retaining laminations 37 near the ends of the outer legs opposite the openings 38 to be utilized in a manner similar to the openings 38 when a frame or bracket such as 15 is utilized which accommodates the core with the legs extending across the U-shaped bracket. The elongation of the openings 38 and 39 makes the outer or retaining laminations adaptable to different frames such as 15, or such frames which have the detents 23 in a somewhat different position. However, when the laminations are put into the frame with the core legs extending across the U-shaped frame, the detents should fit into the outer ends of the openings.

In the modified structure illustrated in Figures 4 and 5, the frame or bracket structure is the same as that shown in Figures 1 to 3 inclusive, except that the transverse spacing ribs 33 and 34 have been omitted. Such spacing ribs are utilized when an insulating terminal carrying strip is to be inserted between the core and the frame. In Figures 4 and 5, reference numerals similar to those appearing in Figures 1 to 3 refer to like parts. The outer or retaining laminations illustrated in Figures 4 and 5 are similar to those utilized in the form shown in Figures 1 to 3 except that openings 40 and 42 are somewhat wedge-shaped with their outer sides substantially parallel to the outer edges of the laminations. This wedge-shaped opening is conducive to ease of assembly and permits some variation in dimensions of the assembled brackets and laminations.

In the modified forms of the core assembly shown in Figures 6 to 9 inclusive, frames or brackets 43 and 44 have lugs or tabs 45 and 46 integrally formed on the extending ends of wings or side flanges 47 and 48 which are adapted to be folded over the assembled core to hold the laminations in place. The ends of the lugs or tabs 45 and 46 are preferably cut angularly to fit together with the oppositely disposed tab or lug and thereby bridge across all of the laminations. The frames or brackets 43 and 44 which are illustrated in Figures 6 and 8 are similar, except that the dimensions of the frame illustrated in Figure 8 are adapted to the placement of the laminations of the core in the frame with the core legs extending across the frame. Openings 47 in the outer or retaining laminations 37, illustrated in Figure 6, are elongated and similar to those illustrated in Figure 1; while openings 48 in the outer or retaining laminations 37 of Figure 8 are preferably round and fit snugly over the detents 23.

Figures 10, 11 and 12 illustrate the comparative sizes and shapes of the component parts of the core and of the outer or retaining laminations 37.

While the embodiment of the present invention as herein disclosed, constitutes a preferred form, it is to be understood that other forms might be adopted, all coming within the scope of the claims which follow.

What is claimed is:

1. A core assembly for electrical apparatus comprising, in combination, a stack of substantially E-shaped laminations of magnetic material and a cooperating stack of substantially I-shaped laminations of magnetic material adapted to extend across and close the open side of the stack of E-shaped laminations, substantially E-shaped outer laminations on each side of the stack which conform to the E-shaped stack and have outer legs which extend across both the E-shaped and I-shaped laminations, said outer legs having apertures near the unconnected ends thereof, a substantially U-shaped frame providing a channel into which the stacks of laminations and outer laminations snugly fit, said frame having integral detents which fit into said apertures, and means comprising lugs integral with the frame and folded over the laminations for holding the laminations in place with respect to the frame.

2. A core assembly for electrical apparatus comprising, in combination, a stack of substantially E-shaped laminations of magnetic material and a cooperating stack of substantially I-shaped laminations of magnetic material adapted to extend across and close the open side of the stack of E-shaped laminations, substantially E-shaped outer laminations on each side of the stack which conform to the E-shaped laminations, said outer legs having apertures near the unconnected ends thereof, a substantially U-shaped frame having integral side flanges providing a channel into which the stacks of laminations and outer laminations snugly fit, said side flanges of the frame having integral detents which fit into said apertures, and means comprising integral lugs on the ends of some of the side flanges and folded over the laminations for holding the laminations in place with respect to the frame.

3. A core assembly for electrical apparatus comprising, in combination, a substantially U-shaped frame formed from sheet stock and having integral side flanges providing channels and integral mounting flanges, a core of magnetic material comprising stacked laminations fitting snugly into said channels, the outer laminations of said stack having openings therein near the open side of the U-shaped frame, and detents in said side flanges fitting into said openings to prevent the sides of the frame from spreading apart.

4. A core assembly for electrical apparatus comprising, in combination, a substantially U-shaped frame formed from sheet stock and having integral side flanges providing channels, a core of magnetic material comprising stacked laminations fitting snugly into said channels, the outer laminations of said stack having elongated openings therein near the open side of the U-shaped frame, the longer dimension of said openings being substantially parallel to the sides of the frame, and detents in said side flanges fitting into said openings to prevent the sides of the frame from spreading apart.

OSCAR A. PEARSON.